B. J. TAMARIN.
LENS FOR HEADLIGHTS.
APPLICATION FILED JAN. 10, 1920.

1,382,871.

Patented June 28, 1921.
2 SHEETS—SHEET 1.

WITNESSES
Guy M. Spring
V. B. Hilliard

Inventor
BERNARD J. TAMARIN
By Richard B. Owen
Attorney

B. J. TAMARIN.
LENS FOR HEADLIGHTS.
APPLICATION FILED JAN. 10, 1920.
1,382,871.
Patented June 28, 1921.
2 SHEETS—SHEET 2.
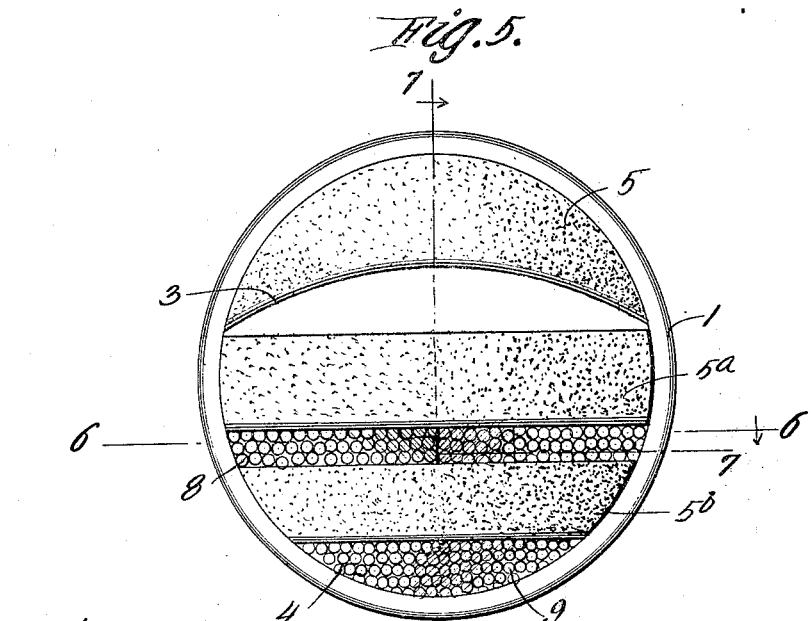
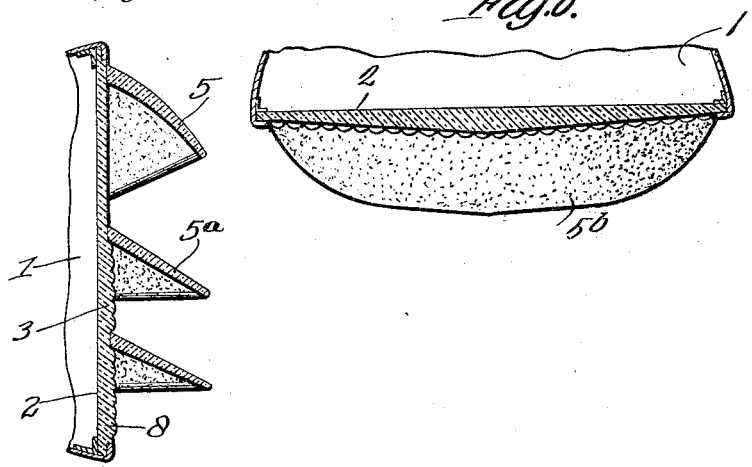
WITNESSES
Guy M. Spring
V. B. Hillyard
Inventor
BERNARD J. TAMARIN
By Richard B. Owen
Attorney

UNITED STATES PATENT OFFICE.

BERNARD J. TAMARIN, OF PHILADELPHIA, PENNSYLVANIA.

LENS FOR HEADLIGHTS.

1,382,871.  Specification of Letters Patent.  Patented June 28, 1921.

Application filed January 10, 1920. Serial No. 350,494.

*To all whom it may concern:*

Be it known that I, BERNARD J. TAMARIN, a citizen of the United States, residing at Philadelphia, in the county of Philadelphia and State of Pennsylvania, have invented certain new and useful Improvements in Lenses for Headlights, of which the following is a specification.

Traffic regulations relative to headlights for motor vehicles aim to prevent the glare which is annoying and dangerous, both to drivers and pedestrians alike and is a prolific source of trouble in after nightfall driving. On the other hand it is essential to safety, that ample light be provided to illuminate the road a distance ahead of a motor vehicle to prevent its running against an obstruction or leaving the road.

The present invention provides a lens for the front of a headlight which will illuminate the road and the ditches at the sides thereof sufficiently far in advance of the machine to guard against accident and which will prevent the blinding of the driver of an approaching vehicle. The invention consists of a lens or lamp front of such formation as to diffuse the rays of light and thereby prevent the glare incident to direct or unmodified light rays, said lens or lamp front being provided with a plurality of vizors or shields so disposed as to leave unobstructed portions of the lens between adjacent vizors for the forward projecting of the light rays, but which vizors relatively cut off the direct light rays and prevent the blinding of the driver of an approaching vehicle proportionately as the distance between the approaching vehicle decreases so that when the two vehicles are close together the glare is entirely cut off since the vizors completely shield the lens and are interposed between the source of light and the vision of the distant driver.

The drawings illustrate a preferred embodiment of my invention. However, it is to be understood that in adapting the same to meet different conditions, various changes in the form, proportion and minor details of construction may be resorted to without departing from the nature of the invention as claimed hereinafter.

The accompanying drawings illustrate embodiments of the invention and on reference thereto:—

Figure 1:
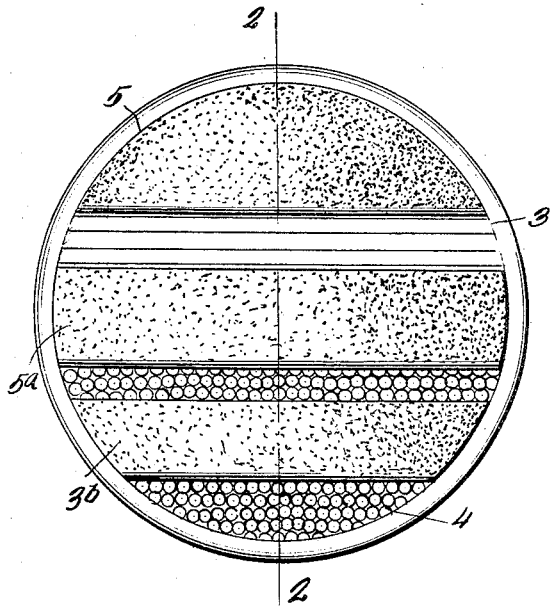

Figure 1 is a front view of a headlight provided with a lens or lamp front embodying the essential features of the invention.

Figure 2:
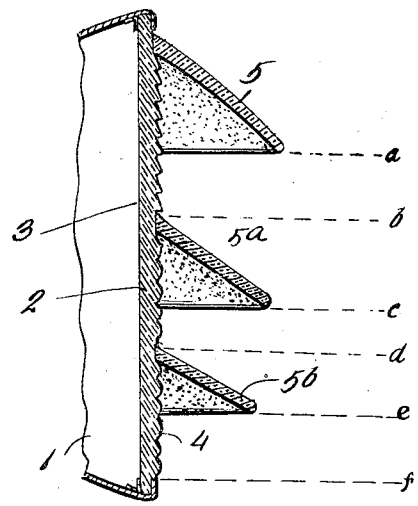
Figure 4:
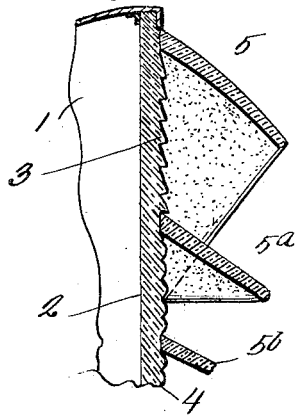
Figure 3:
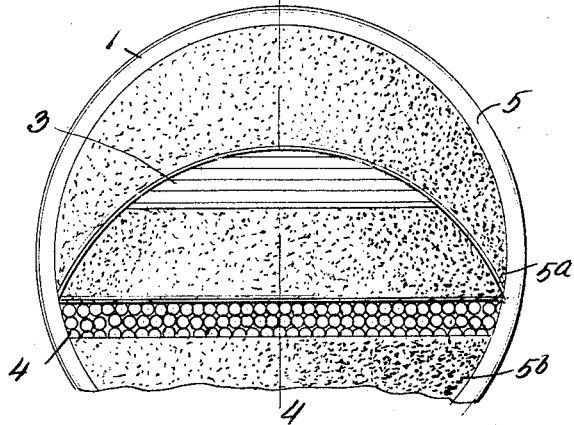

Fig. 2 is a sectional detail on the line 2—2 of Fig. 1, the rear portion of the lamp body being broken away, Fig. 3 is a front view of a modification, Fig. 4 is a sectional detail on the line 4—4 of Fig. 3, Fig. 5 is a front view of a further modification, Fig. 6 is a horizontal section on the line 6—6 of Fig. 5, Fig. 7 is a sectional detail on the line 7—7 of Fig. 5.

Corresponding and like parts are referred to in the following description and indicated in the several views of the drawings.

The numeral 1 designates a lamp body such as generally provided for the headlights of motor vehicles. The lens or lamp front is retained in position by means of a flange or other well known way in the construction of vehicle lamps.

The numeral 2 designates the lens or lamp front which may be of any usual construction so as to diffuse the rays of light and modify their action so as to prevent the blinding glare incident to direct or unmodified light rays. The upper portion of the lens or lamp front 3 is of prismatic formation as indicated at 3 whereas the remaining portion may be of any formation so as to insure a diffusion of the rays of light. While it is preferred to have the upper portion 3 of prismatic formation and the remaining portion of nodular or protuberant formation as indicated at 4, nevertheless it is to be understood that these parts may be of like or different formation so as to modify the rays of light and prevent the glare and blinding action.

A plurality of vizors or shields are disposed at the front of the lens or part 2 and may be of any construction and arrangement. The vizors or shields have an approximately parallel arrangement and are adapted to occupy a horizontal position when the lens or lamp front is properly positioned. The vizors or shields, are designated by the numerals 5, 5$^a$ and 5$^b$. The topmost vizor or shield 5 is approximately of crescent formation and curves transversely and forwardly and downwardly, as indicated most clearly in Figs. 2, 3 and 4. The vizors 5$^a$ and 5$^b$ extend straight across the lens or lamp front. While the several vizors or shields project forwardly from the lens, they nevertheless are downwardly deflected so as to throw the rays of light downwardly and prevent the blinding action which otherwise would be experienced by a person in advance of the headlight. The vizors may form a part of the lens or lamp front, or may be separate therefrom and attached thereto, in any manner. Obviously if the vizors are of glass or vitreous material, they will be welded or otherwise fastened to the lens in a manner well understood, but if of other material they may be retained in place in any desired way, so long as they serve the purpose for which they are provided. The vizors may be curved or straight, and may be of uniform or varying lengths. The portion of the lens or lamp front between the vizors 5 and $5^a$ is preferably of prismatic formation, whereas the portions between the vizors $5^a$ and $5^b$ and below the vizor $5^b$ are of nodular or protuberant formation. The design of the protuberances may vary according to the caprice of the manufacturer, so long as the resultant structure serves to diffuse the rays of light.

An essential and vital feature of the invention resides in the relative disposition of the vizors or shields. Referring more particularly to Fig. 2 of the drawings the dotted lines —a— designate a horizontal plane touching the lower edge of the vizor or shield 5. The dotted lines —b— represent a horizontal plane touching the upper edge of the vizor or shield $5^a$. The dotted lines —c— represent the position of a horizontal plane touching the lower edge of the vizor $5^a$. The dotted lines —d— indicate the position of a horizontal plane in line with the upper edge of the vizor or shield $5^b$. It will thus be understood, that the space between the horizontal planes represented by the dotted lines a—b—c and d and below a horizontal plane touching the lower edge of the vizor $5^b$ are unobstructed horizontally so that rays of light are projected forwardly to the limit of the lamp or illuminating device. This provides for the driver being enabled to observe the roadway some considerable distance in advance of the machine or vehicle so as to prevent a casualty by running into an obstruction or leaving the road. However, as the line of vision which is in a higher plane than the headlight approaches the latter the horizontal rays of light are cut off to a degree proportionately as the distance between the headlight and the person approaching the same decreases. When the person such as the driver of an approaching vehicle is relatively close to the headlight, the horizontal rays of light are entirely cut off thereby relieving such person of any blinding glare or light which would tend to cause discomfort or prevent proper observation of the road. It is well known that a person at a distance from a headlight is not usually blinded thereby, but a glaring headlight at a short distance is not only confusing but blinding and tends to prevent proper observation of the road and as a result fatalities frequently occur. The present invention provides a lens or lamp front which will enable the rays of light to be projected some considerable distance in advance of the vehicle, but which will prevent the blinding glare when the distance separating an observer from a headlight is relatively short. The driver of a vehicle is so positioned that the line of vision is some considerable distance above that of a line passing horizontally through the headlight, hence the angle between the line of vision of an approaching driver and a headlight becomes more obtuse as the distance decreases and when such driver is a relatively short distance from the headlight, the horizontal rays of light are entirely cut off by the vizors or shields in a manner herein indicated.

As herebefore stated, the formation of the lens or lamp front is immaterial so far as the essence of the invention is involved, and said lens may be of uniform thickness as indicated most clearly in Figs. 2 and 4 or of varying thickness as designated in the modification illustrated in Figs. 5, 6 and 7. As shown in Fig. 5, the upper portion 3 of the lens is plain, straight and of uniform thickness. The intermediate portion 8, as shown most clearly in Fig. 6, has its medial portion thickest from said medial vertical line to opposite edges. As a result of the structural formation, the rays of light are diffused laterally instead of being thrown forwardly, the result being that ditches at the sides of the roadway are illuminated, thereby enabling the driver to avoid depressions or obstructions at the sides of the road. The lower portion 9 is straight and of uniform thickness. The light passing through the portions 3 and 9 of the lens is projected straight ahead. The light passing through the portion 8 is projected laterally to illuminate the sides and ditches and obstructions at the sides of the road. The nodular or analogous formation of the portions 8 and 9 diffuses the light rays. The light passing through the plain portion 3 is shed straight ahead to the capacity of the illuminator. The lower portion of the lens comprised between the dotted lines $e$ and $f$ of Fig. 2 throws the rays of light straight ahead.

Having thus fully described my invention what I claim as new and desire to secure by Letters Patent is:—

1. A lens or lamp front for headlights provided with a plurality of vizors or shields, the topmost vizor being approximately of crescent formation and the succeeding vizors having an approximately parallel arrangement, and said vizors being spaced apart to admit of portions of the lens projecting rays of light forwardly in horizontal lines, the portions of the lens between the vizors being of protuberant or nodular formation to insure a diffusion of the rays of light and thereby prevent the blinding glare.

2. A lens or lamp front for headlights having its medial vertical portion thickened and gradually decreasing in thickness from such medial vertical line toward opposite edges and provided with a plurality of vizors disposed to admit of light rays being projected horizontally and said lens having the portions between the vizors of nodular formation to insure diffusion of the light rays.

3. A lens or lamp front having the upper portion plain and straight, the intermediate portion laterally inclined and the lower portion straight, the intermediate and lower portions being of light diffusing structure, and vizors disposed between the several portions and arranged to leave forward light projecting portions.

In testimony whereof I affix my signature in presence of two witnesses.

BERNARD J. TAMARIN.

Witnesses:
M. TAMARIN,
MIRIAM N. EASTWOOD.